United States Patent

Molino

[15] 3,656,782
[45] Apr. 18, 1972

[54] DUCT STRUCTURE

[72] Inventor: Angelo R. Molino, 816 East Building, Haddonview, Haddonfield, N.J. 08033

[22] Filed: Oct. 28, 1969

[21] Appl. No.: 871,820

[52] U.S. Cl................................285/189, 285/325, 285/404, 285/424
[51] Int. Cl.............................................F16l 5/00
[58] Field of Search.................285/325, 326, 327, 189, 424, 285/404

[56] References Cited

FOREIGN PATENTS OR APPLICATIONS

| 745,534 | 2/1933 | France....................................285/325 |
| 894,766 | 4/1962 | Great Britain..........................285/424 |

Primary Examiner—Dave W. Arola
Attorney—Jacob Trachtman

[57] ABSTRACT

A duct structure comprising a duct having a sidewall with an opening having opposite side edges and end edges extending between said said side edges, said side wall being formed with cuts extending from said opening laterally outward adjacent to one end edge, and a generally tubular open-ended take-off having one end generally similar to and larger than said sidewall opening and located outwardly of said duct with said one take-off end proximate to said sidewall opening, said take-off having a flange extending partially about said one take-off end conformably along the other end edge and side edges of said opening interiorly of said duct, said flange being provided with a groove extending therealong into said take-off and slidably receiving said other end edge and side edges of said opening, said take-off being slidably removable away from said opening with said flange engaged in said cuts, said take-off having a lip projecting from said one take-off end extending along said one end edge in facing engagement with the exterior of said sidewall.

9 Claims, 4 Drawing Figures

PATENTED APR 18 1972 3,656,782
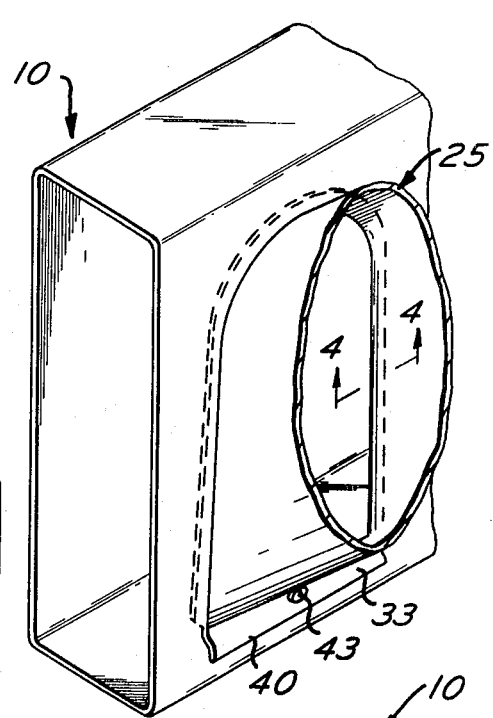
FIG. 3
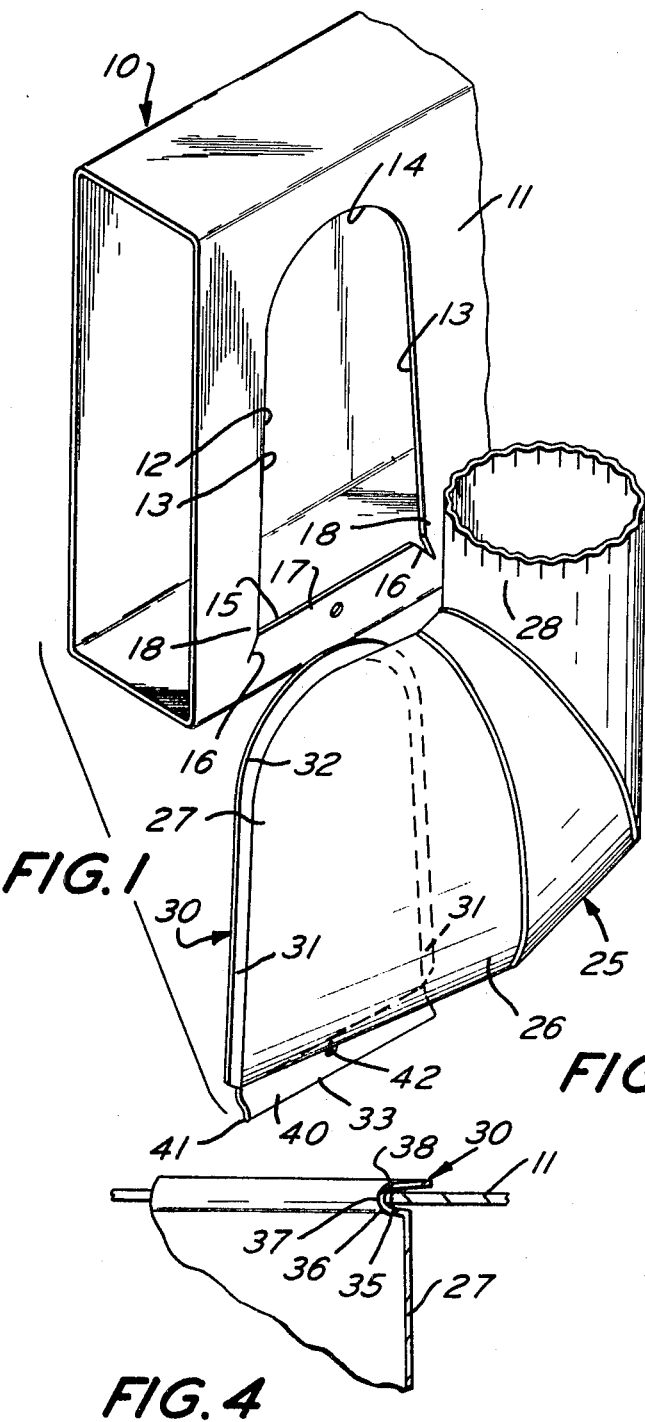
FIG. 1
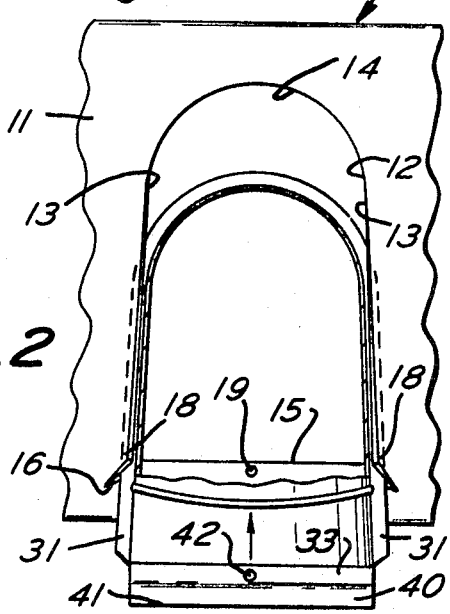
FIG. 2
FIG. 4
INVENTOR
ANGELO R. MOLINO
BY Jacob Trachtman
ATTORNEY

3,656,782

DUCT STRUCTURE

This invention relates generally to a duct structure, and is especially concerned with unique means for interconnecting ducts in building construction.

As is well known to those versed in the art, it is common practice to run branch ducts from a main duct, and connecting the branch ducts to the main duct by means of a take-off. There have, in the past, been provided various structures for connecting a take-off to a main line or duct, however these structures have not been entirely satisfactory by reason of their expense, lack of sealing, and by the difficulty and time consumed in making the necessary connection.

It is therefore an object of the present invention to provide a duct structure including a take-off which is extremely simple in structure, capable of quick and easy connection in a system of duct-work, and which provides highly effective sealing action for efficient utilization under substantial pressure.

It is still another object of the present invention to provide a duct structure having the advantageous characteristics mentioned in the preceding paragraph, which is entirely reliable and durable throughout a long useful life, and which is capable of economic manufacture for sale at a reasonable price.

Other objects of the present invention will become apparent upon reading the following specification and referring to the accompanying drawings, which form a material part of this disclosure.

The above objects and advantages, as well as many other advantages are achieved by providing a duct structure comprising a duct having a sidewall with an opening providing opposite side edges and end edges extended between the side edges. The side wall is formed with cuts extending from the opening laterally outward adjacent to one end edge. A generally tubular open-ended take-off having one end generally similar to and larger than said sidewall opening is located outwardly of the duct with the one take-off end proximate to the sidewall opening. The take-off has a flange extending partially about one take-off end comformably along the other end edge and side edges of the opening interiorly of the duct. The flange is provided with a groove extending therealong into the take-off and slidably receiving the other end edge and side edges of the opening. The take-off is slidably removable away from the opening with the flange engaged in the cuts. The take-off has a lip projecting outward from one take-off end extending along the one end edge in facing engagement with the exterior of the sidewall. The lip is in resilient bearing engagement with the exterior of the sidewall along the one end edge, and includes fastener means detachably securing the lip to the sidewall to hold the take-off against sliding removal away from the opening. The fastening means include aligned openings in the one end edge of the duct and the lip of the take-off and a screw element extending therethrough and securing same together.

The invention accordingly consists in the features of construction, combinations of elements, and arrangements of parts, which will be exemplified in the structure hereinafter described, and of which the scope will be indicated by the appended claims.

In the drawings:

FIG. 1 is a perspective view showing a duct take-off of the present invention just prior to assembly with a duct;

FIG. 2 is an elevational view, partly in section, showing an intermediate stage of assembling the duct take-off and duct;

FIG. 3 is a perspective view showing the duct take-off of the instant invention fully assembled with a duct; and FIG. 4 is a fragmentary sectional view taken generally along the line 4—4 of FIG. 3.

Referring now more particularly to the drawings, and specifically to FIG. 1 thereof, a duct 10, which may be a main duct or trunk, and may be of generally rectangular cross-sectional configuration has a substantially flat side wall 11. The sidewall 11 is formed with a through opening or hole 12, which may be of generally elongated configuration and bounded within a pair of opposite side edges 13, and a pair of end edges 14 and 15 extending between the side edges at opposite ends thereof.

More specifically, the side edges 13 of the opening 12 may be generally straight, and may, if desired, diverge slightly in the direction away from end edge 14. In the illustrated embodiment the end edge 14 is concavely arcuate and merges smoothly at its opposite ends with the side edges 13. The end edge 15 may be generally straight and extend laterally between the side edges 13 remote from the end edge 14. Further, the duct sidewall 11 is advantageously formed with a pair of slits or cuts 16 each extending obliquely laterally outward from the opening 12 at respective corners adjacent to the end edge 15. That is, the cuts or slits 16 in the sidewall 11 may be considered as extending obliquely laterally outward from the side edges 13 at the end edge 15, or otherwise considered as extending obliquely longitudinally outward from the end edge 14 at opposite sides of the opening. In any event, as duct-work is conventionally fabricated of sheet metal, the slits or cuts 16 combined with the end edge 15 to form in the sidewall 11 a relatively stiff, but deformable flap 17. Also, the slits or cuts 16 each combine with the adjacent region of intersecting side edge 13 to provide a tab 18. Also formed in the sidewall 11 is a through opening or hole 19, which may be located adjacent to and spaced from the medial region of end edge 15, for a purpose appearing presently.

A duct take-off 25 having a tubular body 26 with one end region 27 is adapted for attachment to the duct 10, and has its other end region 28 adapted for connection to a branch duct or line (not shown). Opposite end regions 27 and 28 of the tubular take-off body 26 are open for fluid communication with respective ducts; and, the end region 28 may be inclined or disposed in angular relation with respect to the end region 27 and rotatable relative thereto, which is conventional in duct-work take-offs. The end region 28 is shown as generally round for connection to a round duct, while the end region 27 is biascut to define an elongate end opening.

In particular, the opening of end region 27 is of a configuration generally congruent or similar to that of sidewall opening 12 in the duct 10. Further, extending partially about and bounding the take-off end region 27 is a flange 30, including opposite side portions 31 and an arcuate end portion 32 extending between and merging smoothly with one pair of adjacent ends of the side-flange portions. In addition, a lip 33 extends along the remainder of the periphery of take-off end region 27 between the other adjacent pair of ends of the side-flange portions 31. The flange portions 30 project outward for engagement between or interiorly of the duct sidewall 11 along respective side edges 13, while the arcuate flange portion 32 is generally convex and outstanding for conforming engagement beneath or on the inner side of the arcuate end edge 14.

Further, as best seen in FIG. 4, the flange 30 is formed with an outwardly facing groove 35 extending longitudinally along and coextensive with the flange for receiving the edges 13 and 14 of the sidewall opening 12. In practice, the flange 30 is advantageously formed of the sheet-metal material of the end region 27, which material is bent in or indented, as at 36 along a line extending partially about the end region 27, and thence reversely bent at 37, with the terminal margin or remainder 38 projecting outward and defining a flange proper. By this construction, the grooved flange 30 is formed integrally with the body 26 of take-off 25.

If desired, the side-flange portions 31 may diverge slightly in the direction away from the arcuate flange portion 32 in conformance with the configuration of side edges 13.

Along the remainder of take-off body end region 27, the generally straight lip is provided at 33. The lip is advantageously an integral extension of the adjacent material of the take-off end region 27 and may be bent or curved, as at 40, to define a stiffening rib along its free end 41. The lip 33 may be provided with a through fastener-receiving opening, as at 42; and, before assembly of the take-off 25 with the duct 10, the lip 33 may extend obliquely slightly beyond the plane of the adjacent take-off end opening, and be resiliently deformable into the plane of the opening, for a purpose appearing presently.

In assembly, see FIG. 1, it is only necessary to slide the take-off 25 upward, engaging the flange 30 through the cuts 16, until the flange groove 35 entirely receives the edges 13 and 14 of the sidewall opening 12. This engagement of the flange 30 through the cuts 16 is facilitated by slight deformation of the corners 18 and/or of the flap 17. Upon full engagement of the edges 13 and 14 in the flange groove 35, it will be apparent that a firm joint is defined thereby. Also, connection of the take-off end 28 with a branch duct may be made simultaneously upon the hereinbefore described sliding engagement. The slight divergence of side edges 13 and flange side portions 31 facilitates the above-described connection and insures firm seating of the edges with the grooved flange. In this condition, with the take-off end region 27 generally congruent to and opening through the sidewall opening 12 of duct 10, the lip 40 extends along the edge 15 and flap 17, and is slightly resiliently deformed to bear firmly against the flap 17 and further insure effective sealing of the connection. Toward the same end, and to prevent accidental disconnection of the take-off 25 with the duct 10, a fastener 43 may be engaged through the lip hole 42 and flap hole 19 to draw the same together and positively lock the take-off 25 in its snug fitting connection with the duct 10. Of course, should disassembly be required it is only necessary to remove the fastener 43 and shift the take-off 25 by slidably withdrawing the flange side portions 31 through the cuts 16. Thus, while a staunch, strong and well-sealed joint is provided by the above-described structure, it is seen that the assembled components may be detached in a quick and easy manner without deformation or damage thereto.

From the foregoing, it is seen that the duct structure of the present invention provides a highly improved and more effectively sealed gas passageway, effects substantial savings in labor of construction and assembly, and otherwise fully accomplishes its intended objects.

Although the present invention has been described in some detail by way of illustration and example for purposes of clarity of understanding, it is understood that certain changes and modifications may be made within the spirit of the invention and scope of the appended claims.

What is claimed is:

1. A duct structure comprising a duct having a sidewall with an opening having opposite side edges and end edges extending between said side edges, said sidewall being formed with cuts extending from said opening laterally outward adjacent to one end edge, and a generally tubular open-ended take-off having one end generally similar to and larger than said sidewall opening and located outwardly of said duct with said one take-off end proximate to said sidewall opening, said take-off having a flange extending partially about said one take-off end comformably along the other end edge and side edges of said opening interiorly of said duct, said flange being provided with a groove extending therealong into said take-off and slidably receiving said other end edge and side edges of said opening, said take-off being slidably removable away from said opening with said flange engaged in said cuts, said take-off having a lip projecting away from the opening of said one take-off and extending along said one end edge in facing engagement with the exterior of said sidewall.

2. The structure of claim 1, in which said lip is in resilient bearing engagement with the exterior of said sidewall along said one end edge, and including fastener means detachably securing said lip to said sidewall to hold said take-off against sliding removal away from said opening.

3. The structure of claim 1 in which said take-off extends generally angularly from said one end thereof towards said other edge of said opening for simultaneous connection of both ends of said take-off.

4. The structure of claim 1, in which said other end edge of said opening is arcuately concave and merges smoothly with said side edges, and said flange has an arcuately convex portion for conforming engagement with said other end edge.

5. The structure of claim 2 in which said fastening means include aligned openings in said one end edge of said duct and said lip of said take-off and a screw element extending therethrough and securing same together.

6. The structure of claim 8, in which the side edges of said duct diverge toward said one end edge, and said flange of said take-off has diverging portions extending from said convex portion for conforming engagement with the side edges of said duct.

7. The structure of claim 4, in which said one end edge of said duct is generally straight, and said lip of said take-off is generally straight for conforming extension along said one end edge of said duct.

8. A duct take-off for being partially received through an opening in and secured with the sidewall of a duct comprising a generally tubular open-ended body of sheet-metal material having one end generally similar to and larger than the sidewall opening of a duct and having an indented region extending partially about said body adjacent to one end thereof to define an outwardly facing groove, said groove being circumferentially continuous throughout its entire length, said body having said material extending generally outward beyond said groove to provide an outstanding flange for being received through the opening of said duct, and extending along the remainder of said one body end which does not have said groove to provide an outstanding lip projecting outwardly away from said body for direct facing engagement with the exterior of the sidewall of said duct. said lip being offset from said outstanding flange in a direction toward the other end of said body by an amount at least equal to the thickness of the material forming the sidewall of the duct to which it is to be connected.

9. The duct take-off of claim 6, in which said lip is resilient and includes fastener means for detachably securing said lip to said side wall for holding said body against removal from said duct.

* * * * *